United States Patent
Markovic

(10) Patent No.: US 12,406,518 B2
(45) Date of Patent: Sep. 2, 2025

(54) METHODS AND SYSTEMS FOR DETERMINING THE AUTHENTICITY OF AN IDENTITY DOCUMENT

(71) Applicant: Daon Technology, Dublin (IE)

(72) Inventor: Zorana Markovic, Novi Sad (RS)

(73) Assignee: Daon Technology, Douglas (IM)

( * ) Notice: Subject to any disclaimer, the term of this patent is extended or adjusted under 35 U.S.C. 154(b) by 388 days.

(21) Appl. No.: 17/977,032

(22) Filed: Oct. 31, 2022

(65) Prior Publication Data

US 2024/0144713 A1     May 2, 2024

(51) Int. Cl.
| | |
|---|---|
| *G06V 30/42* | (2022.01) |
| *G06V 10/26* | (2022.01) |
| *G06V 10/774* | (2022.01) |
| *G06V 20/00* | (2022.01) |
| *G06V 30/418* | (2022.01) |
| *G06V 40/10* | (2022.01) |

(52) U.S. Cl.
CPC .............. *G06V 30/42* (2022.01); *G06V 10/26* (2022.01); *G06V 10/774* (2022.01); *G06V 20/95* (2022.01); *G06V 30/418* (2022.01); *G06V 40/10* (2022.01)

(58) Field of Classification Search
CPC ...... G06V 30/42; G06V 10/26; G06V 10/774; G06V 20/95; G06V 30/418; G06V 40/10
See application file for complete search history.

(56) References Cited

U.S. PATENT DOCUMENTS

| | | | |
|---|---|---|---|
| 2004/0081332 | A1 | 4/2004 | Tuttle et al. |
| 2018/0108101 | A1* | 4/2018 | Rodriguez ........... G06K 7/1417 |
| 2018/0219681 | A1* | 8/2018 | Geiman ................ H04L 9/3231 |
| 2019/0213408 | A1* | 7/2019 | Cali ..................... G06V 30/414 |
| 2019/0384955 | A1 | 12/2019 | Frieser et al. |
| 2021/0034861 | A1* | 2/2021 | Roebuck .............. G06V 30/418 |

OTHER PUBLICATIONS

Extended European Search Report for related EPO Application No. 23189038.5, dated Feb. 2, 2024, pp. 1-8.

* cited by examiner

*Primary Examiner* — Stephen R Koziol
*Assistant Examiner* — Michael Kim Maiden
(74) *Attorney, Agent, or Firm* — Kevin McDermott, Esq.

(57) ABSTRACT

A method for determining authenticity of a document is provided that includes the step of capturing, by an electronic device, an image of a document. The document includes image data of a biometric modality of a user and informational data. Moreover, the method includes the steps of cropping the captured image data to include an image of the document only, removing the informational data from the cropped image, and generating a gray scale image from the cropped image. The gray scale image and the cropped image are a pair of images. Furthermore, the method includes the step of simultaneously processing, by a trained machine learning model (MLM) each image in the pair of images, to determine whether the identity document in the captured image is authentic.

15 Claims, 4 Drawing Sheets

METHODS AND SYSTEMS FOR DETERMINING THE AUTHENTICITY OF AN IDENTITY DOCUMENT

BACKGROUND OF THE INVENTION

This invention relates generally to authenticating identity documents, and more particularly, to methods and systems for determining the authenticity of an identity document.

Individuals conduct transactions with many different service providers in person and remotely over the Internet. Network-based transactions conducted over the Internet may involve, for example, opening a bank account, arranging an airline flight or arranging a cruise using a website or mobile application. Service providers typically require successfully identifying an individual before he or she is permitted to open a bank account, board a flight, board a ship or conduct any other type of network-based transaction involving sensitive information.

Service providers typically require individuals to upload an image of his or her identity document, like a driver's license or a passport, and a claim of identity to facilitate authentication. The uploaded images are typically analyzed to determine whether the identity document in the uploaded image is authentic, jurisdictionally accurate, and unexpired. The analysis may be manual or automatic.

Imposters have been known to impersonate individuals by providing a false claim of identity supported by a fraudulent identity document when attempting to deceive a service provider into concluding the imposter is the person he or she claims to be. Such impersonations are known as spoofing. Additionally, impostors have been known to use many methods to obtain or create fraudulent identity documents. For example, imposters have been known to alter identity documents by laminating another person's image onto their own identity document or to change the text of another person's identity document. The imposters upload images of the altered documents, for example, when attempting to open a bank account, arranging a flight or arranging a cruise. Such fraudulent identity documents are difficult to detect using known techniques. Consequently, opening a banking account, arranging a flight, or arranging a cruise with an uploaded image of an identity document captured at a remote location depends on verifying the identity document in the uploaded image is authentic.

Known methods for determining the authenticity of an identity document in an image may analyze various features of the document, for example, the text font, presence of security features, and color spectrum, and may verify the uploaded image was not taken of a photocopy. The features may be analyzed manually or automatically.

However, manually reviewing uploaded identity documents is slow, inefficient, not scalable, and very expensive. Additionally, known methods of automatically analyzing identity documents typically generate results that are not as accurate and trustworthy as desired.

Thus, it would be advantageous and an improvement over the relevant technology to provide a method and a computer capable of enhancing the accuracy and trustworthiness of authenticity detection results, enhancing security, facilitating a reduction in identity document review costs, and facilitating a reduction in costs incurred due to successful spoofing attacks.

BRIEF DESCRIPTION OF THE INVENTION

An aspect of the present disclosure provides a method for determining authenticity of a document that includes the step of capturing, by an electronic device, an image of a document. The document includes image data of a biometric modality of a user and other data. Moreover, the method includes the steps of cropping the captured image to include an image of the document only, removing the other data from the cropped image, and generating a gray scale image from the cropped image. The gray scale image and the cropped image are a pair of images. Furthermore, the method includes the step of simultaneously processing, by a trained machine learning model (MLM), each image in the pair of images to determine whether the identity document in the captured image is authentic.

Another aspect of the present disclosure provides a non-transitory computer-readable recording medium in an electronic device capable determining the authenticity of identity documents. The non-transitory computer-readable recording medium stores instructions which when executed by a hardware processor performs the steps of the methods described above.

Yet another aspect of the present disclosure provides an electronic device for determining authenticity of a document including a processor and a memory configured to store data. The electronic device is associated with a network and the memory is in communication with the processor. The memory has instructions stored thereon which, when read and executed by the processor, cause the electronic device to capture an image of a document. The document includes image data of a biometric modality of a user and other data. Additionally, the instructions when read and executed by the processor, cause the electronic device to crop the captured image to include an image of the document only, remove the other data from the cropped image, and generate a gray scale image from the cropped image. The gray scale image and the cropped image are a pair of images. Furthermore, the instructions when read and executed by the processor, cause the electronic device to simultaneously process, by a trained MLM, each image in the pair of images to determine whether the identity document in the captured image is authentic.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
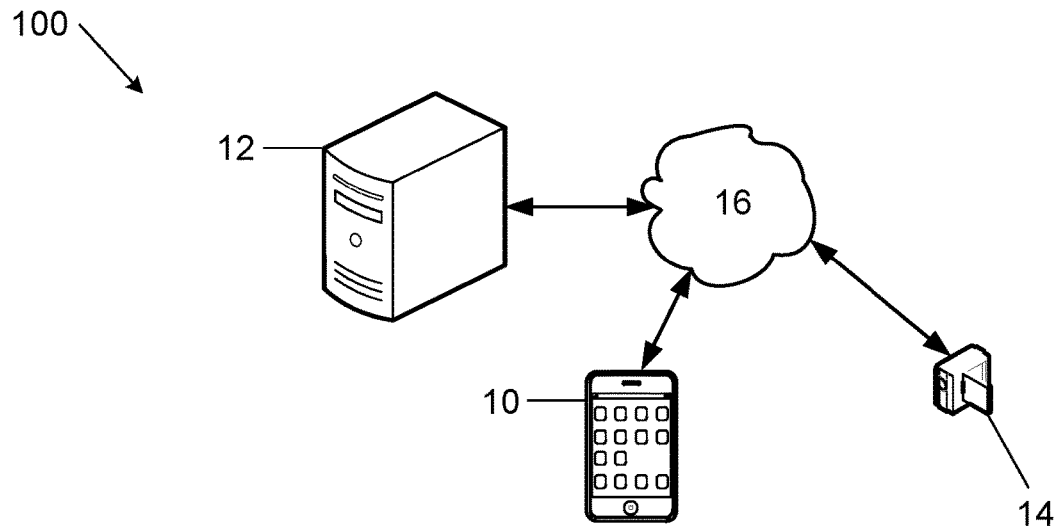
FIG. 1 is a schematic diagram of an example computing system for training a machine learning model and determining authenticity of an identity document using the model according to an embodiment of the present disclosure.

FIG. 1 is a schematic diagram of an example computing system 100 for training a machine learning model and determining the authenticity of an identity document using the model according to an embodiment of the present disclosure. As shown in FIG. 1, the main elements of the system 100 include an electronic device 10, a server 12, and a camera 14 communicatively connected via a network 16.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may be any type of server or computer implemented as a network server or network computer. Other examples include, but are not limited to, a cellular phone, any wireless hand-held consumer electronic device, a smart phone, a tablet computer, a phablet computer, a laptop computer, and a personal computer (PC).

The electronic device 10 is typically associated with a single person who operates the device. The person who is associated with and operates the electronic device 10 is referred to herein as a user.

The server 12 can be, for example, any type of server or computer implemented as a network server or network computer. The camera 14 may be any type of camera capable of capturing any kind of image data and audio data. The electronic device 10, server 12, and camera 14 are electronic devices so each may be alternatively referred to as an electronic device. Additionally, the electronic device 10, the server 12, and the camera 14 may each alternatively be referred to as an information system.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of electronic devices 10, servers 12, and cameras 14 is not limited to the number shown in the system 100. Rather, any number of electronic devices 10, servers 12, and cameras 14 may be included in the system 100.

Figure 2:
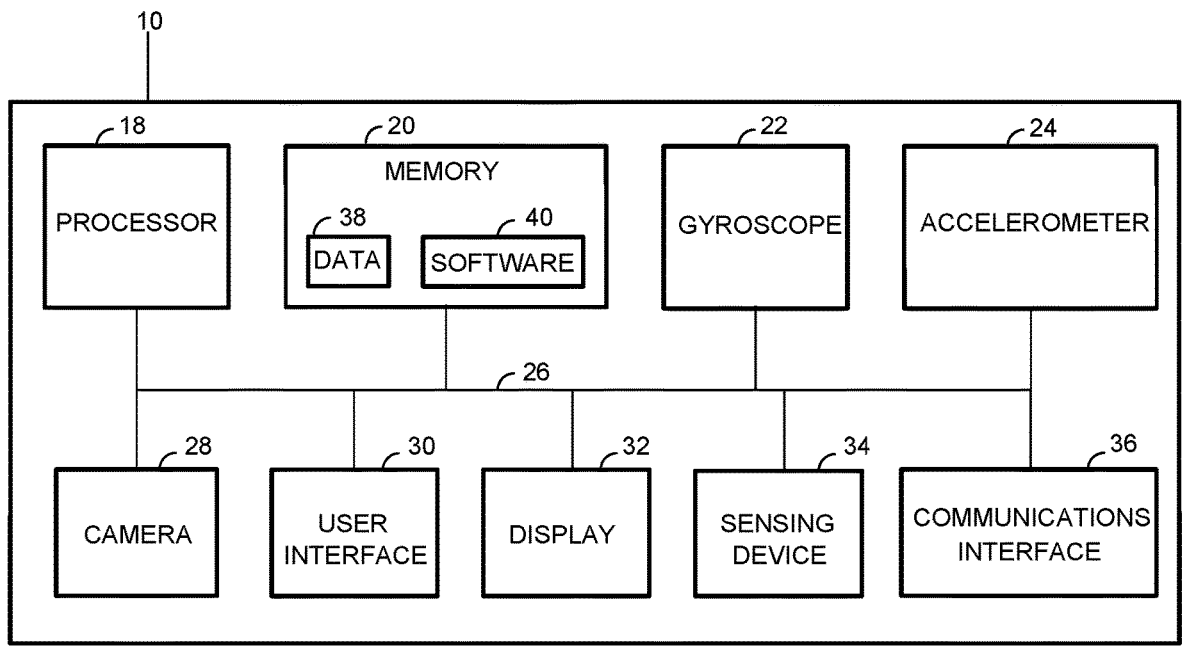
FIG. 2 is a schematic diagram of an example electronic device included in the system shown in FIG. 1.

FIG. 2 is a more detailed schematic diagram illustrating an example electronic device 10 for determining the authenticity of a document according to an embodiment of the present disclosure. The computing device 10 includes components such as, but not limited to, one or more processors 18, a memory 20, a gyroscope 22, an accelerometer 24, a bus 26, a camera 28, a user interface 30, a display 32, a sensing device 34, and a communications interface 36. General communication between the components in the computing device 10 is provided via the bus 26.

The electronic device 10 can be any electronic device capable of at least downloading applications over the Internet, running applications, capturing and storing data temporarily and/or permanently, and otherwise performing any and all functions described herein by any computer, computer system, server or electronic device. Moreover, the electronic device 10 may be any type of server or computer implemented as a network server or network computer. Other examples include, but are not limited to, a cellular phone, any wireless hand-held consumer electronic device, a smart phone, a tablet computer, a phablet computer, a laptop computer, and a personal computer (PC).

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMS, any type of physical and/or virtual storage, or any other digital source such as a network or the Internet from which computer programs, applications or executable instructions can be read.

The memory 20 may be used to store any type of data 38, for example, data records of users and a database of images in which each image is of an identity document. Each data record is typically for a respective user. The data record for each user may include data such as, but not limited to, the user's personal data and images of identity documents associated with the user. Identity documents include, but are not limited to, passports, driver's licenses, and identification cards. The identity documents typically include text.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 20 can be used to store any type of software 40. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, machine learning algorithms (MLA), machine learning models, clustering software, optical recognition software, edge detection software, and any other software and/or any type of instructions associated with algorithms, processes, or operations for controlling the general functions and operations of the electronic device 10. The software may also include computer programs that implement buffers and use RAM to store temporary data.

Machine learning models have parameters that are modified during training to optimize functionality of the models trained using a machine learning algorithm (MLA). A machine learning model (MLM) for verifying the authenticity of identity documents in images may be trained using a machine learning algorithm (MLA). Such machine learning models are typically implemented as neural networks including, but not limited to, Xception, VGG19, EfficientNet B0 to B7, VGG16, ResNet, ResNetV2, MobileNet, MobileNetV2, MobileNetV3, DenseNet, NasNetLarge, NasNetMobile, InceptionV3 and InceptionResNetV2. Examples of edge detection software include, but are not limited to, Sobel filters, Canny edge detectors, SUSAN edge detectors, Rothwell edge detectors, and Laplacian edge detectors. These edge detection programs typically use matrix multiplication. Alternatively, a simple neural network may be used for edge detection. Typically, simple neural networks include two or less hidden layers.

The user interface 30 and the display 32 allow interaction between a user and the electronic device 10. The display 32 may include a visual display or monitor that displays information. For example, the display 32 may be a Liquid Crystal Display (LCD), an active matrix display, plasma display, or cathode ray tube (CRT). The user interface 30 may include a keypad, a camera, a keyboard, a mouse, an illuminator, a signal emitter, a microphone, and/or speakers.

Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 30 communicates this change to the processor 18, and settings can be changed or user entered information can be captured and stored in the memory 20.

The sensing device 34 may include Radio Frequency Identification (RFID) components or systems for receiving information from other devices (not shown) and for transmitting information to other devices. The sensing device 34 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 36 may include various network cards, and circuitry implemented in software and/or hardware to enable wired and/or wireless communications with other devices (not shown). Communications include, for example, conducting cellular telephone calls and accessing the Internet over a network. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet™ or an Asynchronous Transfer Model (ATM) network) to provide a data communication connection to a compatible LAN. As yet another example, the communications interface 36 may be a wire or a cable connecting the electronic device 10 with a LAN, or with accessories such as, but not limited to, other electronic devices. Further, the communications interface 36 may include peripheral interface devices, such as a Universal Serial Bus (USB) interface, a PCMCIA (Personal Computer Memory Card International Association) interface, and the like.

The communications interface 36 also allows the exchange of information across a network between the electronic device 10 and any other device (not shown). The exchange of information may involve the transmission of radio frequency (RF) signals through an antenna (not shown).

Figure 3:
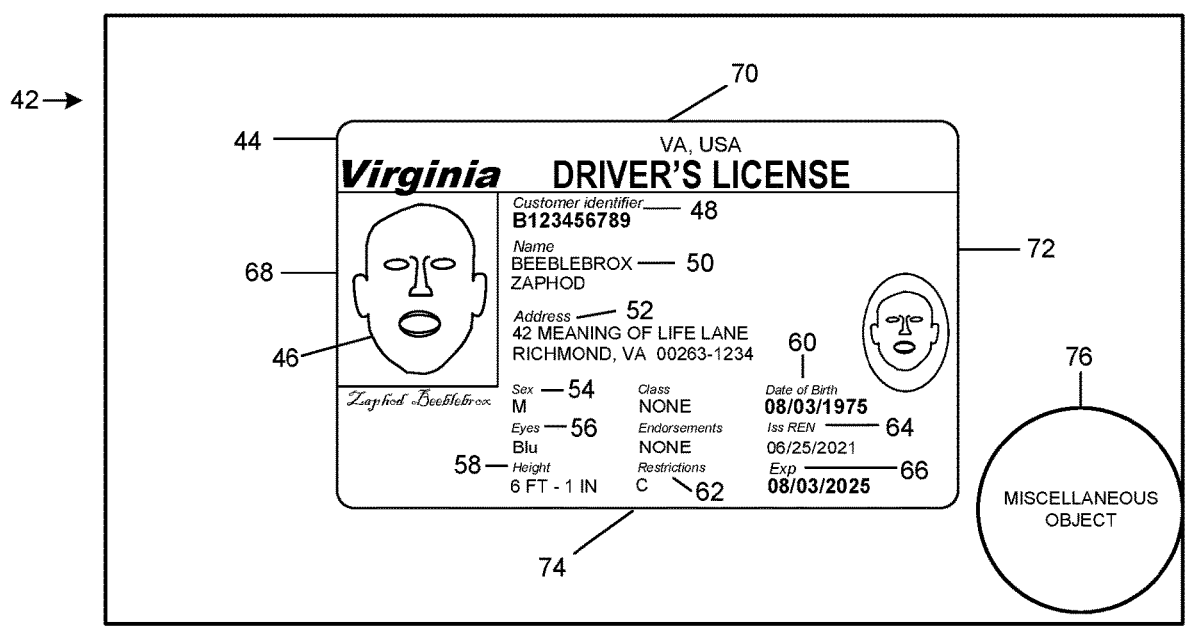
FIG. 3 is a diagram illustrating image data of an example identity document.

FIG. 3 is a diagram illustrating image data 42 of an example identity document 44. The example identity document 44 is a driver's license issued by the Commonwealth of Virginia. However, it is contemplated by the present disclosure that the identity document 44 may alternatively be any identity document used by a person to prove a claim of identity, for example, a passport or an identification card. Moreover, it is contemplated by the present disclosure that the identity document may alternatively be issued by, for example, any state in the United States, any Canadian province, any country, or any governmental entity within any country. The image data 42 includes red, green and blue color components. Images with red, green and blue color component may be referred to herein as RGB images. Although the image data 42 is an RGB image as described herein, the image data 42 may alternatively be, for example, a grayscale image, a hue saturation value (HSV) image, or an image having cyan, magenta, yellow and black (cmyb) color components. The image data 42 may be captured by the electronic device 10, the camera 14 or any other device included in the system 100 capable of communicating with the server 12 via the network 16.

The identity document 44 includes an image 46 of the person to whom the identity document was issued and informational data. Informational data includes, but is not limited to, information about the person to whom the identity document 44 was issued. Such information includes, but is not limited to, a customer identifier 48 as well as the person's name 50, address 52, sex 54, eye color 56, height 58, and date of birth 60. The informational data may also include restrictions 62 the person is required to comply with while driving, the issue renewal date 64, and the expiration date 66. Informational data is typically text and may be obtained from the image using optical character recognition (OCR) techniques. Alternatively, the informational data may be read manually. The image data 42 may be stored in the memory 20 of the electronic device 10, the server 12 or any other computer server or electronic device capable of communicating via the network 16 that may be included in the system 100.

The identity document 44 is rectangular and has a left edge 68, a top edge 70, a right edge 72, and a bottom edge 74. Although the example identity document 44 as described herein is rectangular, the identity document 44 may alternatively have any geometric shape including, but not limited to, a square.

Service providers typically require individuals to upload an image of his or her identity document, like a driver's license or a passport and a claim of identity to facilitate remote authentication. The uploaded images are typically analyzed to determine whether the identity document in the uploaded image is authentic.

Imposters have been known to impersonate individuals by providing a false claim of identity supported by a fraudulent identity document when attempting to deceive a service provider into concluding the imposter is the person he or she claims to be. Such impersonations are known as spoofing. Additionally, impostors have been known to use many methods to obtain or create fraudulent identity documents. For example, imposters have been known to alter identity documents by laminating another person's image onto their own identity document or to change the text of another person's identity document. The imposters upload images of the altered documents, for example, when attempting to open a bank account, arranging a flight or arranging a cruise. Such fraudulent identity documents are difficult to detect using known techniques. Consequently, opening a banking account, arranging a flight, or arranging a cruise with an uploaded image of an identity document captured at a remote location depends on verifying the identity document in the uploaded image is authentic.

Methods for automatically determining the authenticity of an identity document included in an image are known to analyze various features of the document. For example, such methods are known to analyze the text font to verify it comports with the appropriate standards for the respective class of document, determine whether security features are present, determine whether the color spectrum of the document is proper, and verify that the uploaded image was not taken of a photocopy. However, these methods generate less robust authenticity results than desired which can result in compromised security.

To address these problems the electronic device 10 may capture image data 42 of an identity document which includes image data 46 of a biometric modality of a user associated with the identity document and other data. The captured image may be cropped to include an image of the document only, the other data may be removed from the cropped image, and a gray scale image may be generated from the cropped image. The cropped image and the gray scale image constitute a pair of images. A trained machine learning model (MLM) using the pair of images, may determine whether the identity document in the captured image data is authentic.

Image data 42 is frequently taken by users informally photographing their own identity documents 44. For example, users may photograph identity documents 44 positioned on the kitchen table, a dresser or bureau. As a result, image data 42 of identity documents 44 frequently includes a miscellaneous object 76. The miscellaneous object 76 may be any kind or type of object deliberately or accidentally included in the image data 42. For example, the miscellaneous object 76 may be a comb, brush, sandwich, pen, pencil, computer, tool or weapon. The number of miscellaneous objects 76 is not limited to the number shown in the image data 42. Rather, any number of the same or different miscellaneous objects 76 may be included in the image data 42.

Miscellaneous objects 76 may or may not be used for analyzing the identity document 44. As described herein, the miscellaneous object 76 is removed from the image data 42 by cropping the image data 42 to include the identity document 44 only. Alternatively, the miscellaneous data 76 may be removed in any other manner, for example, by using image segmentation techniques and a depth image derived from the cropped image data.

Figure 4:
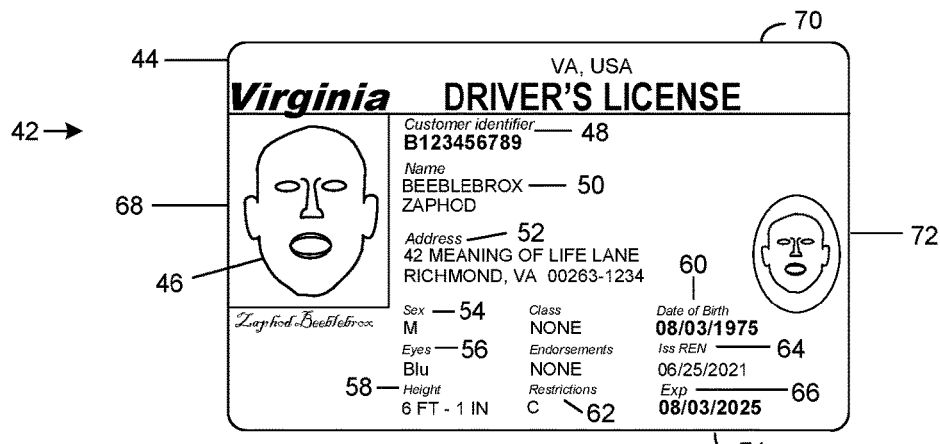
FIG. 4 is image data of the identity document after cropping the image data shown in FIG. 3.

FIG. 4 is the image data 42 after cropping and includes the identity document 44 only. Image data 42 less the miscellaneous objects 76 may be stored in the memory 20 of the electronic device 10, the server 12 or any other computer server or electronic device capable of communicating via the network 16 that may be included in the system 100.

Figure 5:
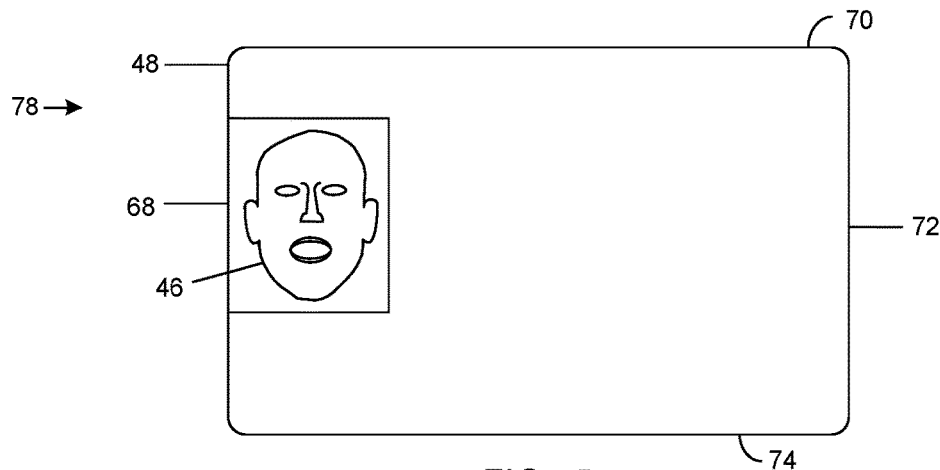
FIG. 5 is an example gray scale image of the identity document created from the cropped image data shown in FIG. 4.

FIG. 5 is an example gray scale image 78 of the identity document 44 created from the cropped image data 42 shown in FIG. 4. The gray scale image 78 may also be stored in the memory 20 of the electronic device 10, the server 12 or any other computer, server, or electronic device capable of communicating via the network 16 that may be included in the system 100. It is contemplated by the present disclosure that the stored cropped image data 42 and the stored gray scale image 78 constitute a pair of images. The stored cropped image data 42 and the stored gray scale image 78 may be stored together as a pair or separately. If stored separately, the cropped image data 42 and the stored gray scale image 78 may be stored at different locations within the same device or may be stored in different devices.

Figure 6:
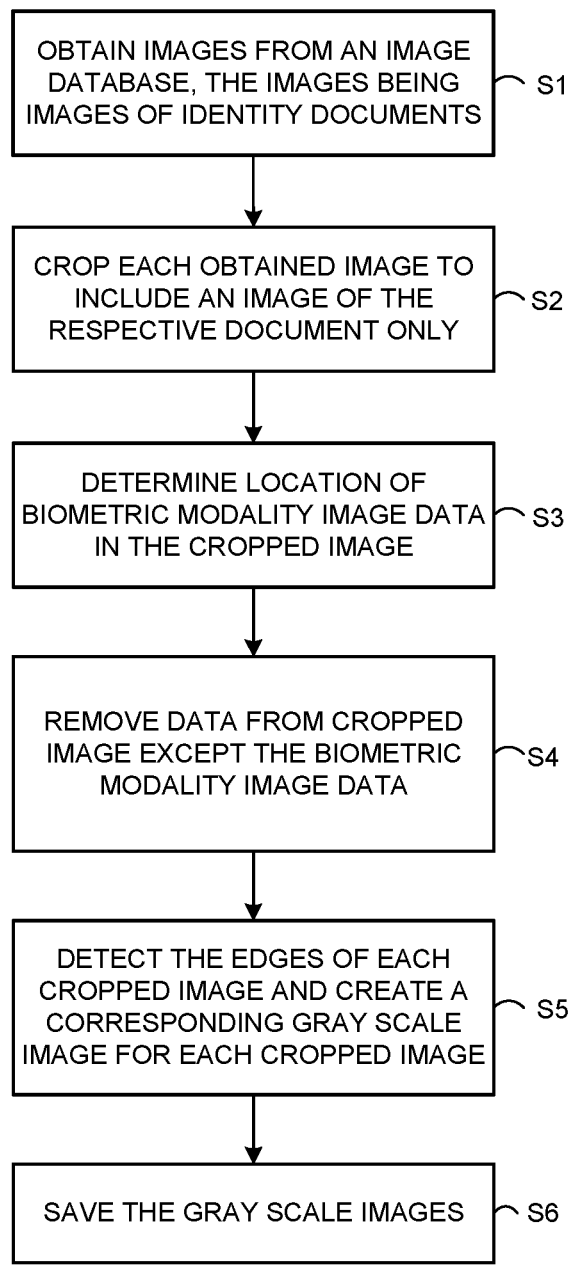
FIG. 6 is a flowchart illustrating an example method and algorithm for creating pairs of images for use in training a machine learning model (MLM) according to an embodiment of the present disclosure.

FIG. 6 is a flowchart illustrating an example method and algorithm for creating pairs of images that may be used to train a machine learning model used to facilitate detecting the authenticity of identity documents. FIG. 6 illustrates example steps performed when the electronic device 10 runs software 40 stored in the memory 20 to create pairs of images that may be used to facilitate detecting the authenticity of an identity document.

In step S1, the software 40 executed by the processor 18 causes the electronic device 10 to obtain image data from an image database. The obtained image data includes an image of an identity document that includes an image 46 of a biometric modality of the person. Each different identity document is typically associate with a different person. As described herein, the biometric modality is face. However, the biometric modality may alternatively be any biometric modality. The obtained image is an RGB image. Next, in step S2, the software 40 executed by the processor 18 causes the electronic device 10 to crop the obtained image to include image data of the identity document only.

In step S3, the software 40 executed by the processor 18 causes the electronic device 10 to determine the location of the biometric modality image in the cropped image data. Then in step S4, the software 40 executed by the processor 18 causes the electronic device 10 to remove other data from the cropped image except the image 46 of the biometric modality. The identity document 42 may include biometric modality images in addition to the image 46. In step S4, all other biometric modality images are removed except for the image 46. Other data as described herein includes the informational data, biometric modality images other than the image 46, and any other data on the identity document.

Next, in step S5, the software 40 executed by the processor 18 causes the electronic device 10 to detect the edges of the cropped image and to create a corresponding gray scale image for the cropped image. A Sobel filter may be used to detect the edges of the cropped image. Alternatively, any edge detector computer program may be used to detect the edges of the cropped image including, but not limited to, a Canny edge detector, an Edison Edge detector, a SUSAN edge detector, a Rothwell Edge detector, or a Laplacian Edge detector.

The cropped image and corresponding gray scale image constitute a pair of images that may be used to train a MLM for use in enhancing the determination of whether an identity document is authentic. In step S6, the pairs of images may be stored in the memory 20 of the electronic device 10, the server 12 or any other computer server or electronic device capable of communicating via the network 16 that may be included in the system 100.

The stored cropped image data 42 and the stored gray scale image may be stored together as a pair or separately. If stored separately, the cropped image data 42 and the stored gray scale image 78 may be stored at different locations within the same device or may be stored in different devices.

Although the images of each cropped image 42 are detected as described herein, the edges may alternatively not be detected. When the edges are not detected, the created gray scale image without edge highlighting may be paired with the cropped image, a depth image created from the cropped image may be paired with the cropped image, or an HSV image created from the cropped image data may be paired with the cropped image.

Although the example method and algorithm for creating pairs of images described herein creates a gray scale image for each cropped image, it is contemplated by the present disclosure that other image types may be created instead of a gray scale image. Such other images include, but are not limited to, a second RGB image, an HSV image, and a cmyb image. The second RGB image may be created by removing the informational data from the cropped image. The cropped image and the second RGB image may be stored together as a pair or separately, similar to the cropped image and gray scale pairs.

Figure 7:
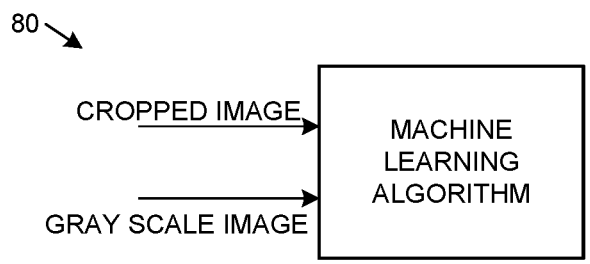
FIG. 7 is a diagram illustrating an example machine learning algorithm (MLA) for training an example MLM for determining the authenticity of an identity document according to an embodiment of the present disclosure.

FIG. 7 is a diagram 80 illustrating an example machine learning algorithm (MLA) for training an example MLM which may be used for determining the authenticity of an identity document according to an embodiment of the present disclosure. The MLM may include a same or different neural sub-network for processing each image. For example, the cropped image may be processed by a VGG19 neural network while the gray scale image 78 may be processed by a DenseNet neural network. Alternatively, both images may be processed by either the VGG19 neural network or the DenseNet neural network. The MLM is considered a network and the same or different neural networks are considered sub-networks within the MLM. Thus, for the example described above, the VGG19 and DenseNet neural networks are sub-networks within the trained MLM.

The cropped image and corresponding gray scale image from a pair of images are entered into the machine learning algorithm which simultaneously processes the images. That is, the neural sub-network for processing the cropped image processes the cropped image at the same time the neural sub-network for processing the gray scale image processes the gray scale image. Using the example neural sub-networks described above, the cropped image can be processed by the VGG19 neural network while the gray scale image can be processed by the DenseNet neural network. Alternatively, the cropped image and corresponding second RGB image may be entered into the algorithm for training a machine learning model that uses pairs of cropped and corresponding second RGB images to determine whether an identity document is authentic.

Many pairs of images are processed by the MLA to train a MLM for use in determining the authenticity of identity documents. The thus trained MLM simultaneously processes pairs of cropped images and gray scale images generated during transactions. When determining the authenticity of an identity document, the trained MLM processes the cropped image and the gray scale image simultaneously to determine whether an identity document is authentic. More specifically, the neural sub-network processing the cropped image generates a score and the neural sub-network processing the gray scale image generates another score. The two scores can be combined in any manner, for example, by calculating the dot product between the scores, adding the scores together, concatenating the scores, or calculating the difference between the scores.

Although two images are simultaneously processed by the MLM, any number of the same or different type of images may alternatively be processed by the MLM. For example, a cropped RGB image, a gray scale image, and a depth image may be processed by the MLM simultaneously. It should be appreciated that each image may be processed by the same or different neural sub-network within the MLM. Thus, the MLM may have more than two sub-networks.

Figure 8:
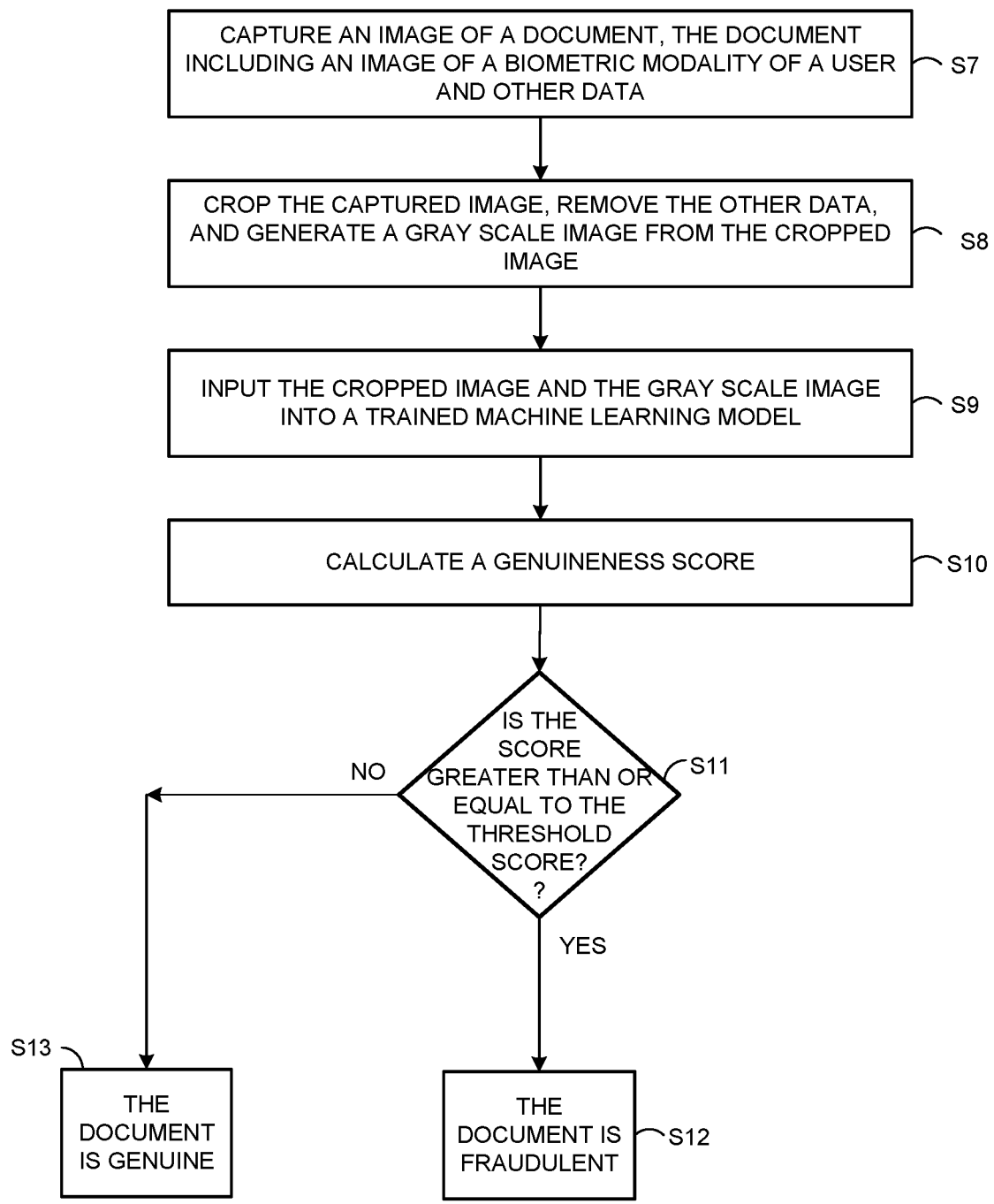
FIG. 8 is a flowchart illustrating an example method and algorithm for determining the authenticity of an identity document according to an embodiment of the present disclosure.

FIG. 8 is a flowchart illustrating an example method and algorithm for determining the authenticity of an identity document according to an embodiment of the present disclosure. The method and algorithm may use the trained MLM as described herein with regard to FIG. 7. FIG. 8 illustrates example steps performed when the electronic device 10 runs software 40 stored in the memory 20 to determine the authenticity of an identity document included in image data capture remotely by an electronic device 10.

In step S7, the software 40 executed by the processor 18 causes the electronic device 10 to capture an image of an identity document. The captured image is an RGB image. The identity document includes an image of a biometric modality of a user and other data. Next, in step S8, the software 40 executed by the processor 18 causes the electronic device 10 to crop the captured image to include the biometric modality data only, remove the other data from the cropped image, and generate a gray scale image from the cropped image. The image 46 of the biometric modality data is not removed. However, all other images of biometric modality data are removed. It is contemplated by the present disclosure that the image 46 may alternatively be removed in other embodiments. In step S9, the cropped image and the gray scale image are input into the trained MLM, then in step S10, the trained MLM processes the cropped image and the gray scale image simultaneously to calculate a genuineness score.

More specifically, the neural sub-network that processes the cropped image generates a score and the neural sub-network that processes the gray scale image generates a score. The two scores can be combined in any manner, for example, by calculating the dot product between the scores, adding the scores together, concatenating the scores, or calculating the difference between the scores. In this example method and algorithm for determining the authenticity of an identity document, the scores are combined by calculating the dot product. The combined score is the calculated genuineness score.

In step S11, the software 40 executed by the processor 18 causes the electronic device 10 to compare the calculated genuineness score against a threshold score. If the genuineness score is equal to or greater than the threshold score, in step S12, the software 40 executed by the processor 18 causes the electronic device 10 to determine that the identity document in the captured image data is authentic. However, when the genuineness score is less than the threshold score, in step S13, the software 40 executed by the processor 18 causes the electronic device 10 to determine that the identity document in the captured image data is fraudulent.

Although a genuineness score is calculated and compared against a threshold score to determine whether an identity document is authentic in the example method and algorithm for determining the authenticity of an identity document described herein, it is contemplated by the present disclosure that the trained MLM may calculate any type of score that may be used to determine whether an identity document is authentic or fraudulent. For example, the trained MLM may calculate a first score representing the likelihood that the identity document in the captured image data is authentic and a second score representing the likelihood that the identity document in the captured image data is fraudulent. When the first score is greater than the second score the identity document may be considered authentic. Otherwise, the document may be considered fraudulent.

Although the example method and algorithm for determining the authenticity of an identity document uses a RGB cropped image and a gray scale image to determine whether an identity document is authentic, it is contemplated by the present disclosure that a different image may be used instead of the gray scale image. For example, a second RGB image, an HSV image, or a cmyb image may be used instead of the gray scale image. When a second RGB image is used, the second RGB image may be created by removing the informational data from the cropped image.

Using the method and algorithm for determining the authenticity of a document described herein facilitates quickly determining whether a received image contains an image of an authentic document. As a result, the method and algorithm facilitate increasing the speed, efficiency, and scalability of document review while reducing costs and enhancing customer convenience and satisfaction.

The example methods and algorithms described herein may be conducted entirely by the electronic device 10, partly by the electronic device 10 and partly by the server 12 or any other server (not shown), electronic device (not shown), or computer (not shown) operable to communicate with the electronic device 10 via a network (not shown). It is contemplated by the present disclosure that the example methods and algorithms described herein may be conducted using any combination of computers (not shown), computer systems (not shown), electronic device (not shown), and electronic devices (not shown). Furthermore, data described herein as being stored in the electronic device 10 may alternatively, or additionally, be stored in any other server (not shown), electronic device (not shown), or computer (not shown) operable to communicate with the electronic device 10 via a network.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for determining authenticity of a document comprising the steps of:

capturing, by an electronic device, an image of a document, the document including image data of a biometric modality of a user and other data;

cropping the captured image to include an image of the document only;

removing the other data from the cropped image;

generating a gray scale image from the cropped image, the gray scale image and the cropped image being a pair of images; and simultaneously processing, by a trained machine learning model (MLM), each image in the pair of images to determine whether the identity document in the captured image is authentic.

2. The method according to claim 1 said simultaneously processing step comprising the steps of:

calculating, by the trained MLM using the pair of images, a genuineness score;

comparing the genuineness score against a threshold score; and in response to determining the genuineness score is greater than the threshold score, determining the identity document in the captured image is authentic; and in response to determining the genuineness score is less than the threshold score, determining the document is fraudulent.

3. The method according to claim 1 said determining step comprising the steps of:

calculating, by the trained MLM using the pair of images a first score representing the likelihood that the document in the captured image data is fraudulent and a second score representing the likelihood that the document is authentic;

comparing the first score against the second score;

in response to determining the first score is greater than the second score, determining the captured image requires manual review; and in response to determining the first score is less than the second score, determining the document is authentic.

4. The method according to claim 1, further comprising the steps of:

obtaining images from an image database, the images being images of identity documents;

cropping each obtained image to include an image of the respective identity document only;

generating a gray scale image from each cropped image, the gray scale image and the cropped image being a pair of images; and training the MLM using the pairs of images, wherein the MLM simultaneously processes the images in each pair of images.

5. The method according to claim 4, said generating a gray scale image step comprising the steps of:
   determining the location of the biometric modality image data in the cropped image; and
   detecting the edges of each obtained image.

6. An electronic device for determining authenticity of a document comprising:
   a processor; and
   a memory configured to store data, said electronic device being associated with a network and said memory being in communication with said processor and having instructions stored thereon which, when read and executed by said processor, cause said electronic device to:
   capture an image of a document, the document including image data of a biometric modality of a user and other data;
   crop the captured image to include an image of the document only;
   remove the other data from the cropped image;
   generate a gray scale image from the cropped image, the gray scale image and the cropped image being a pair of images; and
   simultaneously process, by a trained machine learning model (MLM), each image in the pair of images to determine whether the identity document in the captured image is authentic.

7. The electronic device according to claim 6, wherein the instructions when read and executed by said processor, cause said electronic device to:
   calculate using the pair of images, a genuineness score;
   compare the genuineness score against a threshold score;
   in response to determining the genuineness score is greater than the threshold score, determine the identity document in the captured image is authentic; and
   in response to determining the genuineness score is less than the threshold score, determine the document is fraudulent.

8. The electronic device according to claim 6, wherein the instructions when read and executed by said processor, cause said electronic device to:
   calculate by the trained MLM using the pair of images a first score representing the likelihood that the document in the captured image data is fraudulent and a second score representing the likelihood that the document is authentic;
   compare the first score against the second score;
   in response to determining the first score is greater than the second score, determine the captured image requires manual review; and
   in response to determining the first score is less than the second score, determine the document is authentic.

9. The electronic device according to claim 6, wherein the instructions when read and executed by said processor, cause said electronic device to:
   obtain images from an image database, the images being images of documents;
   crop each obtained image to include an image of the respective document only;
   generate a gray scale image from each cropped image, the gray scale image and the cropped image being a pair of images; and
   train the MLM using the pairs of images, wherein the MLM simultaneously processes the images in each pair of images during said training step.

10. The electronic device according to claim 9, wherein the instructions when read and executed by said processor, cause said electronic device to:
    determine the location of the biometric modality image data in the cropped image; and
    detect the edges of each obtained image.

11. A non-transitory computer-readable recording medium in an electronic device for determining authenticity of a document, the non-transitory computer-readable recording medium storing instructions which when executed by a hardware processor cause the non-transitory recording medium to perform steps comprising:
    capturing an image of a document, the document including an image of a biometric modality of a user and other data;
    cropping the captured image to include an image of the document only;
    removing the other data from the cropped image;
    generating a gray scale image from the cropped image, the gray scale image and the cropped image being a pair of images; and
    simultaneously processing, by a trained machine learning model (MLM), each image in the pair of images to determine whether the identity document in the captured image is authentic.

12. The non-transitory computer-readable recording medium according to claim 11, wherein the instructions when read and executed by said processor, cause said non-transitory computer-readable recording medium to perform the steps of:
    calculating, by the trained MLM using the pair of images, a genuineness score;
    comparing the genuineness score against a threshold score;
    in response to determining the genuineness score is greater than the threshold score, determining the identity document in the captured image is authentic; and
    in response to determining the genuineness score is less than the threshold score, determining the document is fraudulent.

13. The non-transitory computer-readable recording medium according to claim 11, wherein the instructions when read and executed by said processor, cause said non-transitory computer-readable recording medium to perform the steps of:
    calculating, by the trained MLM using the pair of images a first score representing the likelihood that the document in the captured image data is fraudulent and a second score representing the likelihood that the document is authentic;
    comparing the first score against the second score;
    in response to determining the first score is greater than the second score, determining the captured image requires manual review; and
    in response to determining the first score is less than the second score, determining the document is authentic.

14. The non-transitory computer-readable recording medium according to claim 11, wherein the instructions when read and executed by said processor, cause said non-transitory computer-readable recording medium to perform the steps of:
    obtaining images from an image database, the images being images of documents;

cropping each obtained image to include an image of the respective document only;
generating a gray scale image from each cropped image, the gray scale image and the cropped image being a pair of images; and
training the MLM using the pairs of images, wherein the MLM simultaneously processes the images in each pair of images.

15. The non-transitory computer-readable recording medium according to claim 14, wherein the instructions when read and executed by said processor, cause said non-transitory computer-readable recording medium to perform the steps of:
   determining the location of the biometric modality image data in the cropped image; and
   detecting the edges of each obtained image.

\* \* \* \* \*